(12) United States Patent
Kussmaul

(10) Patent No.: US 7,992,276 B2
(45) Date of Patent: Aug. 9, 2011

(54) FIXTURE EXCHANGE RAIL SYSTEM AND METHOD OF USE

(75) Inventor: Andrew S. Kussmaul, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1143 days.

(21) Appl. No.: 11/552,154

(22) Filed: Oct. 24, 2006

(65) Prior Publication Data
US 2008/0104815 A1    May 8, 2008

(51) Int. Cl.
*B23Q 17/00* (2006.01)
(52) U.S. Cl. .............. 29/407.1; 29/407.05; 29/407.09; 228/212; 228/49.1
(58) Field of Classification Search .............. 29/407.01, 29/407.04, 407.05, 407.09, 702, 709, 714, 29/783, 791, 792, 822; 228/49.1, 212, 4.1, 228/5.1, 6.1, 43, 44.3; 219/79, 80
See application file for complete search history.

(56) References Cited

U.S. PATENT DOCUMENTS

| | | | | |
|---|---|---|---|---|
| 5,027,502 A | * | 7/1991 | Sakamoto et al. | 29/783 |
| 5,191,707 A | * | 3/1993 | Sasamoto et al. | 29/783 |
| 5,400,944 A | * | 3/1995 | Zimmer et al. | 228/49.6 |
| 6,173,881 B1 | * | 1/2001 | Sloan et al. | 228/4.1 |
| 6,427,321 B2 | * | 8/2002 | Fedato et al. | 29/787 |
| 7,162,799 B2 | * | 1/2007 | Moore et al. | 29/897.2 |
| 7,178,660 B2 | * | 2/2007 | Dehne et al. | 198/463.1 |

* cited by examiner

*Primary Examiner* — David P Bryant
*Assistant Examiner* — Bayan Salone
(74) *Attorney, Agent, or Firm* — Quinn Law Group, PLLC

(57) ABSTRACT

A fixture exchange rail system is provided having first and second fixture assemblies movably mounted with respect to respective first and second stationary rails. A movable rail is disposed substantially adjacent to, and movable between, the first and second stationary rails. The movable rail is sufficiently configured to selectively receive the first and second fixture assemblies thereon. A method of operating a workstation having a fixture exchange rail system operable to enable work on a workpiece is also provided including the steps of: A) determining the style of workpiece present at the workstation; B) aligning a movable rail with one of a first and second stationary rail having a respective first and second fixture assembly mounted thereto corresponding to the style of workpiece; and C) moving the fixture assembly corresponding to the style of workpiece from the stationary rail to the movable rail.

13 Claims, 2 Drawing Sheets

FIXTURE EXCHANGE RAIL SYSTEM AND METHOD OF USE

TECHNICAL FIELD

The present invention relates to overhead tool or fixture rail systems for workstations and a method of using same.

BACKGROUND OF THE INVENTION

Overhead tool or fixture rail systems are frequently utilized in manufacturing plants having assembly lines. The overhead fixture rail systems are typically arranged in parallel with the assembly line. These overhead fixture rail systems are utilized for hanging tools or fixtures that are required at a given workstation for the use of the production line workers in assembling a workpiece. Modern assembly line designs typically require provisions for the assembly of more than one type of workpiece on the same assembly line. As such, many different types of tools or fixtures are typically hung from a single overhead fixture rail system. This may lead to operator confusion over which tool to use for a given style of workpiece. Additionally, the operator will be required to move the additional tools or fixtures along the rail system in order to position the tool or fixture required for the particular style of workpiece.

SUMMARY OF THE INVENTION

A fixture exchange rail system is provided having a first fixture assembly movably mounted with respect to a first stationary rail and a second fixture assembly movably mounted with respect to a second stationary rail. A movable rail is disposable substantially adjacent to the first and second stationary rails. The movable rail is movable between the first and second stationary rails and is sufficiently configured to selectively receive the first and second fixture assemblies thereon.

A method of operating the fixture exchange rail system of the present invention is also provided. The method includes the steps of: A) determining the style of workpiece present at the workstation; B) aligning a movable rail, either manually or automatically, with one of a first and second stationary rail having a respective first and second fixture assembly mounted thereto corresponding to the style of workpiece; and C) moving one of the respective first and second fixture assembly corresponding to the style of workpiece from the first and second stationary rail to the movable rail.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
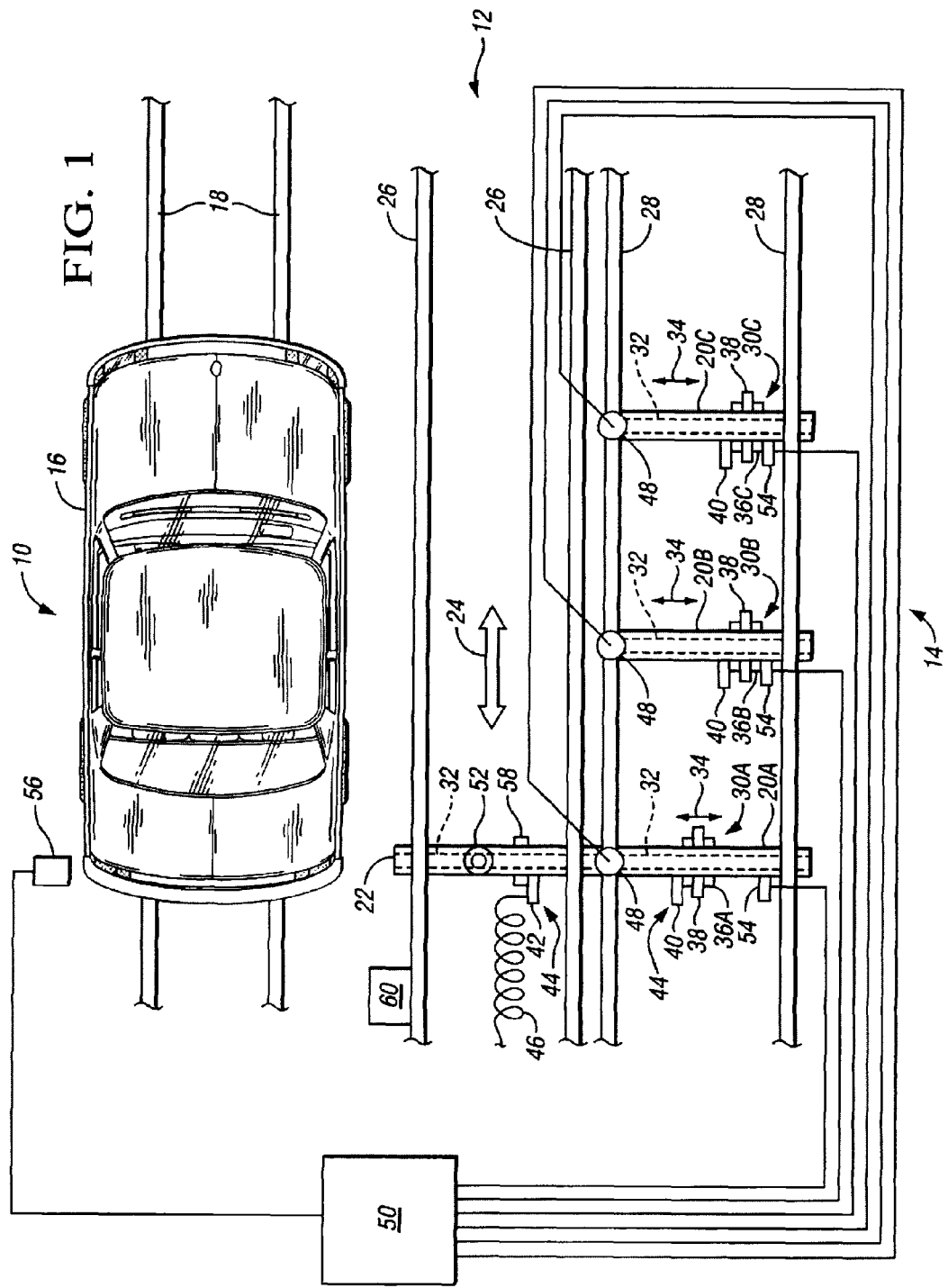
FIG. 1 is a schematic plan view of a portion of an assembly line illustrating a workstation incorporating a fixture exchange rail system of the present invention.

Referring to FIG. 1, there is shown a portion of a production or assembly line 10. The assembly line 10 includes a workstation 12 incorporating a fixture exchange rail system 14 of the present invention. The workstation 12 is sufficiently configured to receive a workpiece 16, such as a partially assembled vehicle, as shown in FIG. 1. The workpiece 16 is guided along the assembly line 10 by a plurality of tracks 18.

The fixture exchange rail system 14 includes a first, second and third stationary rail 20A, 20B, and 20C, respectively, and a movable rail 22. The movable rail 22 is disposed adjacent and movable with respect to the first, second, and third stationary rails 20A, 20B, and 20C in the direction of arrow 24, i.e. substantially parallel to the workpiece 16. The movable rail 22 is suspended by a plurality of tracks 26, while the first, second, and third stationary rails 20A, 20B, and 20C are suspended by a plurality of support members 28.

First, second, and third fixture assemblies 30A, 30B, and 30C are mounted to a respective one of the first, second, and third stationary rails 20A, 20B, and 20C and are slidable within channels 32 in the direction of arrows 34. Each of the first, second, and third fixture assemblies 30A, 30B, and 30C include a respective first, second, and third tool or fixture 36A, 36B, and 36C each suspended from their respective stationary rail 30A, 30B, and 30C by balancers 38. Those skilled in the art will recognize that balancers 38 are operable to reduce the apparent weight of the fixtures 36A, 36B, and 36C, thereby reducing operator fatigue. Additionally, the balancers 38 may be operated by pneumatic force, spring tension, etc., while remaining within the scope of that which is claimed.

The first, second, and third fixture assemblies 30A, 30B, and 30C further include a connector member 40, while a connector member 42 is mounted with respect to the moveable rail 22. The connector members 40 and 42 taken together form a connector mechanism 44 operable to selectively connect the first, second, and third fixture assemblies 30A, 30B, and 30C with the movable rail 22. The first, second, and third tool or fixture 36A, 36B, and 36C are actuated pneumatically via an air hose 46.

Clamping members 48 are provided respectively on each of the first, second, and third stationary rails 20A, 20B, and 20C. The clamping members 48 are operable to retain the movable rail 22 with respect to one of the first, second, and third stationary rails 20A, 20B, and 20C during the transfer of the first, second, and third fixture assemblies 30A, 30B, and 30C to and from the movable rail 22. Those skilled in the art will recognize that the clamping member 48 may be mounted to the movable rail 22, while remaining within the scope of that which is claimed. The clamping members 48 are controlled by a controller 50. Additionally, the controller 50 operates to position the movable rail 22 with respect to a selected one of the first, second, and third stationary rails 20A, 20B, and 20C through a selectively actuatable stop mechanism 52.

Position sensors 54 are provided respectively on each of the first, second, and third stationary rails 20A, 20B, and 20C and operate to provide a signal to the controller 50 to communicate the position of the first, second, and third fixture assemblies 30A, 30B, and 30C. It should be noted that FIG. 1 illustrates the second and third fixture assemblies 30B and 30C in the parked position, while the first fixture assembly 30A is shown in the out of park position. A sensor 56 is preferably mounted with respect to the assembly line 10. The sensor 56 operates to communicate to the controller 50 the type or style of workpiece 16 currently at the workstation 12. In the preferred embodiment, the sensor 56 will operate using optical sensing techniques such as, for example, bar code scanning; however, those skilled in the art will recognize other means of sensing the type or style of workpiece 16 while remaining within the scope of that which is claimed.

A sensor 58 is mounted on the movable rail 22 and operates to signal when the connector member 40 of one of the first, second, and third fixture assemblies 30A, 30B, and 30C has engaged the connector member 42 mounted on the movable rail 22 thereby completing the connection of the connector mechanism 44. The sensor 58 may be mounted with respect to the connector member 42, but need not be. A drive device 60 is controlled by the controller 50 and operates to selectively move the movable rail 22 with respect to the first, second, and third stationary rails 20A, 20B, and 20C.

Figure 2:
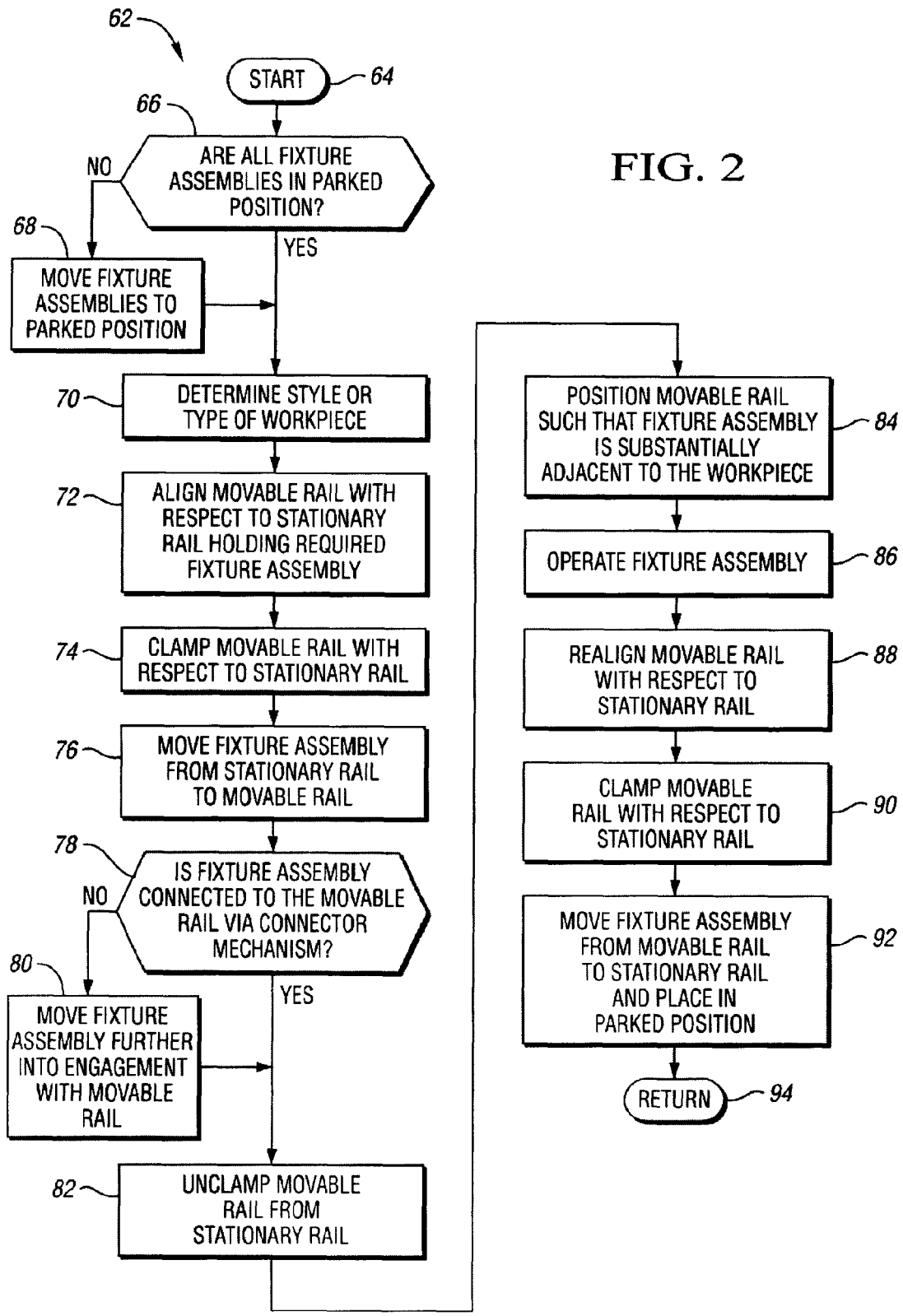
FIG. 2 is an illustration, in flowchart form, of a method of operating the fixture exchange rail system of FIG. 1.

Referring to FIG. 2, and with continued reference to FIG. 1, an exemplary method of operating the fixture exchange rail system 14 of the present invention is represented in FIG. 2, in flowchart form, and is generally indicated at 62. The method 62 begins at step 64 and proceeds to step 66 where it is determined if each of the first, second, and third fixture assemblies 30A, 30B, and 30C are in the parked position. This condition is sensed by the position sensors 54 and communicated to the controller 50. If at least one of the first, second, and third fixture assemblies 30A, 30B, and 30C is not in the parked position the method proceeds to step 68 where they are manually parked; the method 62 then proceeds to step 70. Alternately, if the first, second, and third fixture assemblies 30A, 30B, and 30C are in the parked position, the method 62 proceeds from step 66 to step 70.

At step 70, a determination is made as to the style or type of the workpiece 16. This information is sensed by the sensor 56 and communicated to the controller 50 as described hereinabove. In the preferred embodiment, the controller 50 will command the drive device 60 to move the movable rail 22 to one of the first, second, and third stationary rails 20A, 20B, and 20C containing the respective first, second, and third fixture assemblies 30A, 30B, and 30C appropriate for work on the type of workpiece 16 currently within the workstation 12, as indicated at step 72. The automatic movement of the movable rail 22 does not pose a safety concern since none of the first, second, and third fixture assemblies 30A, 30B, and 30C are mounted thereto. Upon reaching the appropriate one of the first, second, and third stationary rails 20A, 20B, and 20C, for example the first stationary rail 20A, the controller 50 will command the stop mechanism 52 to lock the movable rail 22 in position. At this point, the method 62 will proceed to step 74 where the controller 50 commands the clamping member 48 to engage, thereby clamping the movable rail 22 with respect to the first stationary rail 20A.

Proceeding to step 76, the first fixture assembly 30A is moved from the respective first stationary rail 20A to the movable rail 22. Preferably, step 76 is accomplished manually to give the operator full control over the movement of the first fixture assembly 30A, such that the first fixture assembly 30A can be safely positioned overhead. The method 62 then proceeds to step 78 where a determination is made as to whether the first fixture assembly 30A is connected to the movable rail 22 via the connector mechanism 44. That is, a determination is made as to whether the connector members 40 and 42 are fully engaged. If the connector members 40 and 42 are not engaged, the method 62 moves to step 80 where the first fixture assembly 30A is moved further into engagement with the movable rail 22. The method then proceeds to step 82 where the controller 50 commands the clamping member 48 to unclamp the movable rail 22 from the first stationary rail 20A. At which point the movable rail 22 is free to translate with respect to the first, second, and third stationary rails 20A, 20B, and 20C. The method 62 then proceeds to step 84.

At step 84, the movable rail 22, and therefore the first fixture assembly 30A is positioned substantially adjacent to the workpiece 16 thereby allowing the first fixture assembly 30A to be operated, at step 86, to effect work on the workpiece 16. Upon the completion of work on the workpiece 16, the movable rail 22 is realigned with the first stationary rail 20A at step 88. Preferably, step 88 is performed manually to give the operator control of the first fixture assembly 30A. Once aligned with the first stationary rail 20A, the method 62 will proceed to step 90 where the movable rail 22 is clamped in place as a result of a command by the controller 50 to the clamping member 48. Once the movable rail 22 is clamped in place, the method 62 proceeds to step 92 where the first fixture assembly 30A is moved from the movable rail 22 to the first stationary rail 20A such that the first fixture assembly 30A engages the position sensor 54 to signal to the controller 50 that the first fixture assembly 30A is in the fully parked position. The method 62 then proceeds to step 94 to begin the cycle again.

The fixture exchange rail system 14 of the present invention provides assembly line flexibility by accommodating multiple styles of the workpiece 16, while maintaining ergonomically advantageous tool organization. Additionally, by automatically determining the style of workpiece 16 and directing the movable rail 22 to the appropriate one of the first, second, and third fixture assembly 30A, 30B, and 30C, improper assembly and damage to the workpiece 16 caused by the use of an improper fixture assembly may be eliminated.

Additionally, although the foregoing description illustrates a fixture exchange rail system 14 having first, second, and third stationary rails 20A, 20B, and 20C, those skilled in the art will recognize that additional or fewer stationary rails may be employed for a given workstation 12 while remaining within the scope of that which is claimed.

While the best modes for carrying out the invention have been described in detail, those familiar with the art to which this invention relates will recognize various alternative designs and embodiments for practicing the invention within the scope of the appended claims.

The invention claimed is:
1. A fixture exchange rail system comprising:
a first stationary rail defining a channel;
a first fixture assembly slidably mounted with respect to said channel of said first stationary rail;
at least one other stationary rail defining a channel;
at least one other fixture assembly slidably mounted with respect to said channel of said at least one other stationary rail;
a movable rail defining a channel and configured to be selectively engagable with said first stationary rail and said at least one other stationary rail;
wherein said movable rail is movable between said first stationary rail and said at least one other stationary rail and is sufficiently configured to selectively receive said first fixture assembly and said at least one other fixture assembly thereon;
wherein said first fixture assembly is slidably movable from one to the other of said channel of said first stationary rail and said channel of said movable rail when said first stationary rail and said movable rail are engaged; and
wherein said at least one other fixture assembly is slidably movable from one to the other of said channel of said at least one other stationary rail and said channel of said movable rail when said at least one other stationary rail and said movable rail are engaged.

2. The fixture exchange rail system of claim 1, further comprising at least one clamping member configured to selectively clamp said movable rail said first stationary rail and said at least one other stationary rail, such that as one of said first fixture assembly and said at least one other fixture assembly is slidably moved from or to said movable rail, one of said first stationary rail and said at least one other stationary rail is clamped to said movable rail.

3. The fixture exchange rail system of claim 1, further comprising a controller operable to selectively control movement of said movable rail between said first stationary rail and said at least one other stationary rail.

4. The fixture exchange rail system of claim 1, wherein the fixture exchange rail system is configured for use at a workstation of an assembly line.

5. The fixture exchange rail system of claim 1, further comprising:
 at least one balancer; and
 wherein at least one of said first fixture assembly and said at least one other fixture assembly is sufficiently connected to said at least one balancer to reduce the apparent weight of said at least one of said first and second fixture assemblies.

6. The fixture exchange rail system of claim 1, further comprising:
 a connector mechanism having a first connector member selectively connectable with a second connector member;
 wherein said first connector member is mounted with respect to said movable rail; and
 wherein said second connector member is mounted with respect to at least one of said first fixture assembly and said at least one other fixture assembly such that as said at least one of said first fixture assembly and said at least one other fixture assembly is received on said movable rail, said first connector member and said second connector member of said connector mechanism are connected.

7. The fixture exchange rail system of claim 1, wherein at least one of said first fixture assembly and said at least one other fixture assembly is pneumatically operated.

8. The fixture exchange rail system of claim 3, further comprising:
 a sensing device;
 wherein the fixture exchange rail system is configured for use at a workstation for assembling a part onto a workpiece; and
 wherein said sensing device is operable to determine the required position for said movable rail as a function of said workpiece to signal said controller to move said movable rail.

9. A workstation configured for work on a workpiece, the workstation comprising:
 a sensor operable to determine the style of the workpiece;
 a fixture exchange rail system including:
  a first fixture assembly movably mounted with respect to a first stationary rail;
  at least one other fixture assembly movably mounted with respect to at least one other stationary rail;
  a movable rail disposed substantially adjacent to and configured to be selectively movable from one to another of said first stationary rail and at least one other stationary rail;
  at least one clamping member configured to selectively clamp said movable rail to said first stationary rail and said at least one other stationary rail such that said movable rail is engagable thereto; and
  wherein said movable rail is selectively movable to and selectively engagable with said first stationary rail and said at least one other stationary rail and is sufficiently configured to selectively receive said first fixture assembly and said at least one other fixture assembly thereon.

10. The workstation of claim 9, further comprising a controller operable to receive signals from said sensor and to selectively control movement of said movable rail between said first stationary rail and said at least one other stationary rail.

11. The workstation of claim 9, wherein said fixture exchange rail system further includes:
 at least one balancer; and
 wherein at least one of said first fixture assembly and said at least one other fixture assembly is suspended from said at least one balancer.

12. The workstation of claim 9, wherein said fixture exchange rail system further includes:
 a connector mechanism having a first connector member selectively connectable with a second connector member;
 wherein said first connector member is mounted with respect to said movable rail; and
 wherein said second connector member is mounted with respect to at least one of said first fixture assembly and said at least one other fixture assembly such that as said at least one of said first fixture assembly and said at least one other fixture assembly is received on said movable rail, said first connector member and said second connector member of said connector mechanism are connected.

13. The workstation of claim 9, wherein the workpiece is a vehicle.

\* \* \* \* \*